United States Patent [19]

Yasunobu et al.

[11] Patent Number: 4,617,627
[45] Date of Patent: Oct. 14, 1986

[54] METHOD FOR AUTOMATIC OPERATION OF A VEHICLE

[75] Inventors: Seiji Yasunobu, Yokohama; Shoji Miyamoto, Kawasaki; Hirokazu Ihara, Machida, all of Japan

[73] Assignee: Hitachi, Ltd., Tokyo, Japan

[21] Appl. No.: 570,500

[22] Filed: Jan. 13, 1984

[30] Foreign Application Priority Data

Jan. 17, 1983 [JP] Japan .................................. 58-5641
Jun. 9, 1983 [JP] Japan .............................. 58-103487

[51] Int. Cl.⁴ ...................... G06F 15/48; B60L 15/20
[52] U.S. Cl. .............................. 364/426; 246/182 R; 246/182 B; 364/436
[58] Field of Search ............... 364/424, 426, 436, 442, 364/464, 437, 438; 246/182 A, 182 B, 182 C, 184, 187 R

[56] References Cited

U.S. PATENT DOCUMENTS 4,166,514  9/1979  de Fréminville et al. ... 246/182 R X
4,179,739 12/1979  Virnot ......................... 246/182 R X
4,181,943  1/1980  Mercer, Sr. et al. ............... 364/426
4,305,556 12/1981  Norton et al. ...................... 364/436

Primary Examiner—Felix D. Gruber
Assistant Examiner—Thomas G. Black
Attorney, Agent, or Firm—Antonelli, Terry & Wands

[57] ABSTRACT

This invention relates to a method of automatic vehicle operation which fulfills multi-dimensional performance indices by presetting the weight for power consumption, the weight for the riding comfort, and the like. The modification of running time relative to the standard running time to be spent between two stations, the allowable power consumption relative to the standard power consumption to be spent for the standard running between two stations, and the degree of improvement of riding comfort for the standard running between two stations are set prior to the departure from a station so as to determine control parameters to be used for divided regions of distance between two stations, and the speed of the vehicle between two stations is controlled using the selected control parameters.

25 Claims, 15 Drawing Figures

| No. | RUNNING TIME | POWER CON-SUMPTION | RIDING COMFORT | CONTROL PARAMETER TABLE NUMBER | | |
|---|---|---|---|---|---|---|
| | | | | REGION 1 | REGION 2 | REGION 3 |
| 1 | ±0 | 100 (%) | USUAL | 1 | 1 | 1 |
| 2 | −5 | 90 | USUAL | 2 | 2 | 1 |
| 3 | +5 | 110 | GOOD | 3 | 2 | 2 |
| | | | | | | |
| n | +10 | 80 | USUAL | 3 | 3 | 3 |

FIG. 4
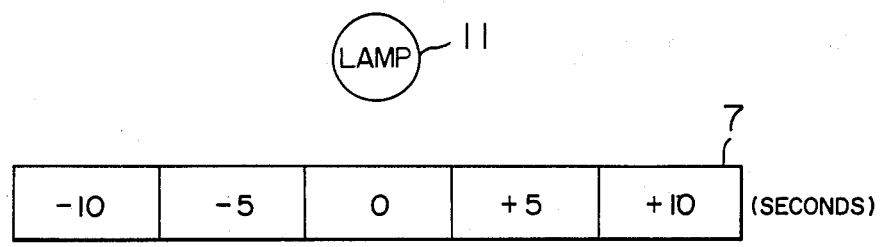
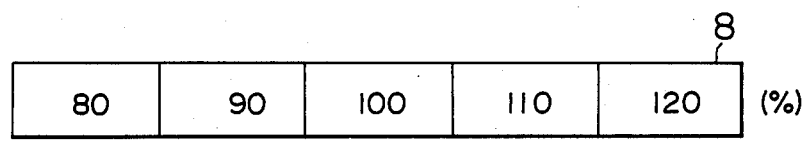
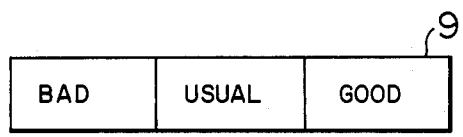
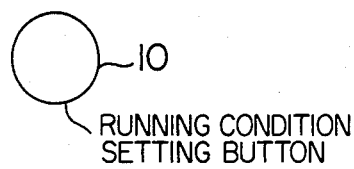

FIG. 10

| GROUND MARKER NUMBER | GROUND MARKER POSITION | THRESHOLD SPEED | RESIDUAL RUNNING TIME STANDARD | STANDARD POWER CONSUMPTION |
|---|---|---|---|---|
| 0 | 0 | 0 | $T_{C0}$ | $E_{C0}$ |
| 1 | $L_{C1}$ | $v_{C1}$ | $T_{C1}$ | $E_{C1}$ |
| 2 | $L_{C2}$ | $v_{C2}$ | $T_{C2}$ | $E_{C2}$ |
| 3 | $L_{C3}$ | $v_{C3}$ | $T_{C3}$ | $E_{C3}$ |

FIG. 11

| POWER-SAVING CONTROL NUMBER | INCREASED RUNNING TIME | GROUND MARKER NUMBER | LOWER TARGET POWER CONSUMPTION | COMPLETE DISTANCE | SAVED POWER CONSUMPTION | TABLE NUMBER |
|---|---|---|---|---|---|---|
| 1 | $T_1$ | $\Delta N_{E1}$ (=2) | $E_p^1$ | $L_{E1}$ | $\Delta E_1$ | $N_{T1}$ (=2) |
| 2 | $T_2$ | $\Delta N_{E2}$ (=3) | $E_p^2$ | $L_{E2}$ | $\Delta E_2$ | $N_{T2}$ (=0) |
| 3 | $T_3$ | $\Delta N_{E3}$ (=1) | $E_p^3$ | $L_{E3}$ | $\Delta E_3$ | $N_{T3}$ (=0) |

| POWER-SAVING CONTROL FACTOR |
|---|
| $J$ (=3) |

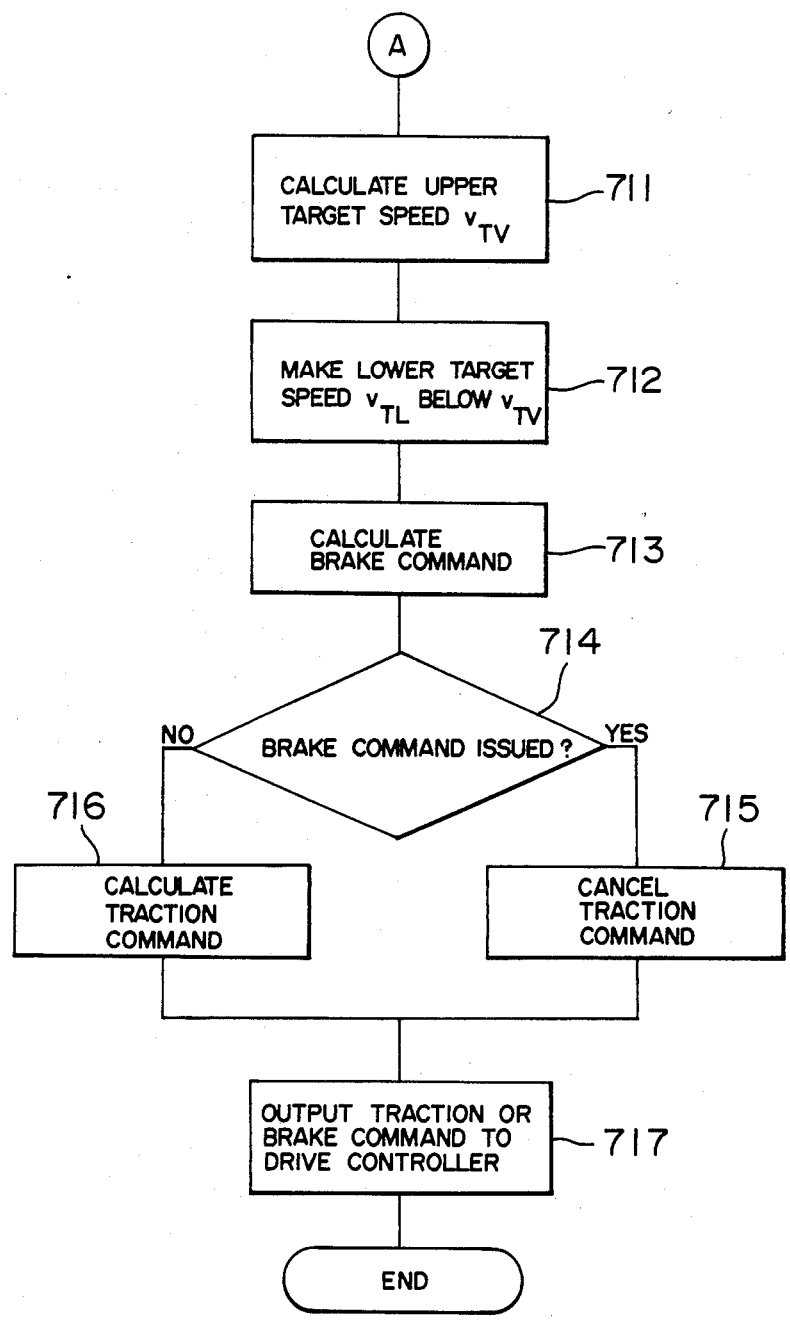

METHOD FOR AUTOMATIC OPERATION OF A VEHICLE

The present invention relates to a method for automatic operation of a vehicle and, particularly, to a method of automatic vehicle operation capable of fulfilling the multi-dimensional performance indices by operating a train or the like in accordance with predetermined control parameters selectively.

Recently, methods of automatic operation of a train have been put into practice in various places in the world. In these conventional methods, a target speed pattern is generated, and control commands are issued to the traction controller or brake controller so that the actual train speed follows the target speed pattern (For example, refer to Japanese Patent Laid-open No. 57-36505.) For operating a train between two stations, according to these methods, a number of running patterns are prepared in advance and the train is operated by selecting and switching the running patterns depending on situations such as a delay on the train diagram. These methods are solely oriented to bring a train conformable to the diagram through the selection of a running pattern based on the running time. More recently, however, there arise demands for lower power consumption and better riding confort in addition to the accurate operation on the train diagram. Examples of new demands are 10% power reduction in the summer season when the gross power consumption hits the peak and better riding confort without vibration when passengers are few, and the operation based on such multi-dimensional performance indices is not possible by the conventional method for the automatic train operation.

It is an object of the present invention to provide a method for automatic vehicle operation capable of fulfilling the multi-dimensional performance indices by setting weights for the power consumption, riding comfort, and so on. The invention resides in the method for the automatic vehicle operation for controlling the running of a vehicle between stations by use of the predetermined control parameters, wherein the distance between two stations is divided into a number of regions, performance indices as a result of application of a set of control parameters to each region are evaluated, and the control parameter used in each region is determined by setting the performance indices in advance. The performance indices include the running time between two stations, power consumption, and riding comfort.

The present invention will be more apparent from the following detailed description taken in conjunction with the accompanying drawings, in which:

FIG. 4 is a layout diagram of the running condition setup console of the first embodiment;

FIG. 10 is a table showing the contents of the condition table provided in correspondence to the ground markers shown in FIG. 7;

FIG. 11 is a table showing the contents of the alternative table shown in FIG. 7 for power-saving control;

FIGS. 13A and 13B are flowcharts showing the process of train control; and

Figure 1:
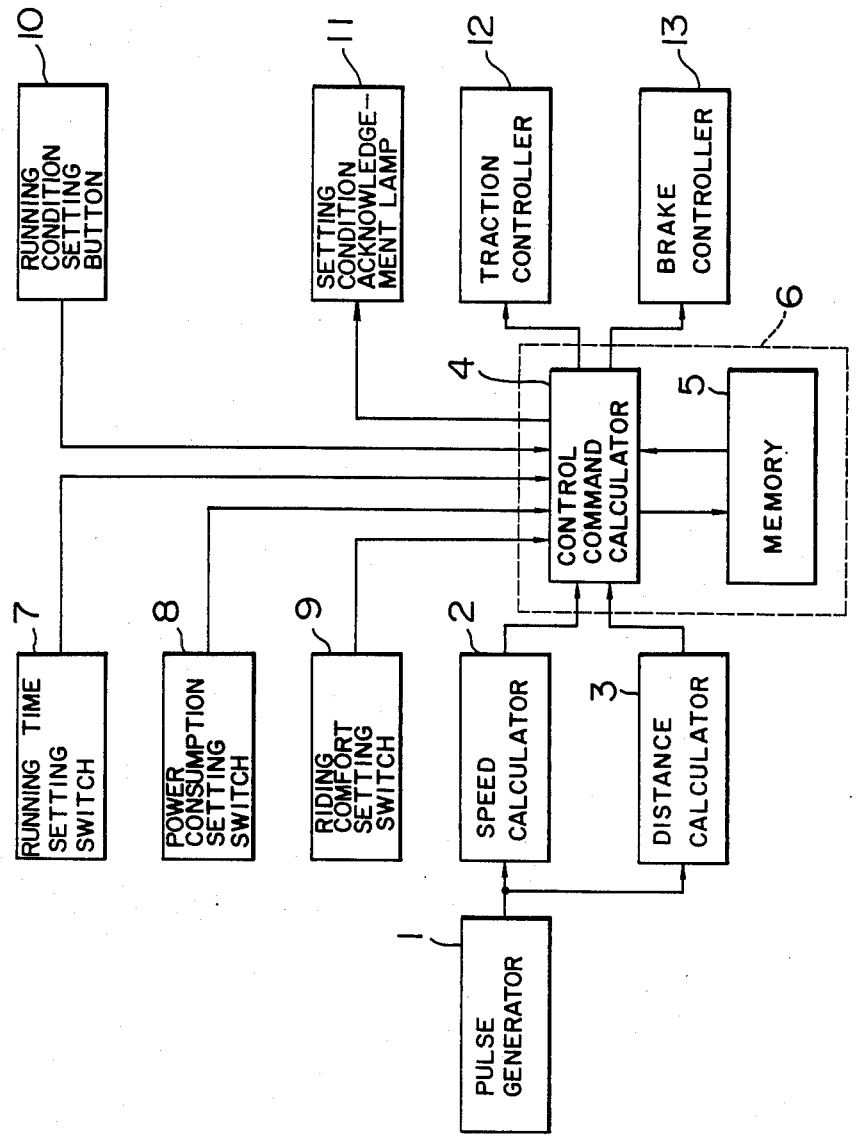
FIG. 1 is a block diagram of the automatic train operation controller according to the first embodiment of the present invention.

In FIG. 1 showing in block diagram the automatic train operation controller according to the first embodiment of the present invention, reference number 1 denotes a pulse generator which generates pulses in proportion to the running distance of the train, and 2 denotes a speed calculator which sums distance pulses produced by the pulse generator 1 to yield the train speed from the running distance of the past one second. Reference number 3 is a distance summation unit which sums distance pulses since the train has started from a station so as to yield the running distance L from the station. These devices 1, 2 and 3 are disclosed in the above-mentioned Japanese Patent Publication. Reference number 7 denotes a switch for setting the running time to be spent until the train will reach the next station, 8 denotes a switch for setting the power consumption, 9 denotes a switch for setting the riding comfort factor, 10 denotes a button for directing the setup of the running conditions, and 11 denotes a lamp which indicates in blue that there exists a combination of control parameters which meets the setting condition, or indicates in red that such combination does not exist, thus prompting the reentry of the running condition. Reference number 4 is a unit which determines control parameters in accordance with the setup of running conditions on the switches 7, 8 and 9, and calculates control commands (powering and braking), and 5 denotes a memory for storing data of running time, power consumption and riding comfort for combinations of control parameters obtained in advance by experiment or simulation. Reference number 12 denotes a traction controller which accelerates the train in response to the traction control command, and 13 denotes a brake controller which decelerates the train in response to the brake control command. Among these devices the control command calculator 4 and memory 5 are realized by use of a microcomputer 6 in this embodiment. The traction controller 12 and brake controller 13 are the units disclosed in the above-mentioned Japanese Patent Publication, and detailed explanation thereof will be omitted.

Figures 2, 3:
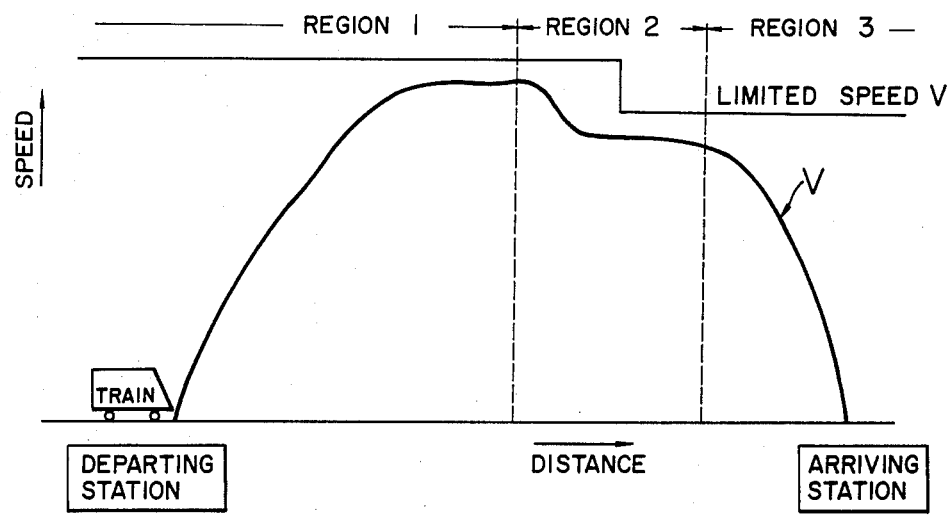
FIG. 2 is a chart showing an example of segmentation of the distance between two stations.
FIG. 3 is a table showing the values of performance indices corresponding to the control parameters.

FIG. 2 is a chart explaining by way of example the segmentation of the distance between two stations, and FIG. 3 is a table of performance indices for the control parameters.

As shown in FIG. 2, the distance from the departing station to the arriving station is divided into three regions, i.e., regions 1, 2 and 3, and control parameters are determined for each region by making reference to the performance index table. The curve V in FIG. 2 represents the train speed as a result of train operation using the control parameters, and the straight lines at the top of the figure represent two limited speeds. The memory 5 stores a performance index table as shown in FIG. 3.

According to the present invention, a plurality of control parameters responsive to the requirements of running time reduction, power consumption cut, and improvement of riding comfort are prepared, the values of performance indices of the running time, power consumption and riding comfort as a result of running using any one of the control parameters in one region between two stations are obtained experimentally or by computer simulation, and a table of performance indices for one set of a combination is prepared in advance. Then, conversely, when performance indices are specified, a control parameter for each region is determined.

As shown in FIG. 3, the performance index table contains the control parameter table number (1, 2, or 3), evaluation of riding comfort (good or bad), and running time (time reduction or delay in seconds) for each region.

FIG. 4 shows an example of the running condition setup console. The console is provided thereon with running time setting switches (−10, −5, 0, +5, and +10 sec) 7, power consumption setting switches (80, 90, 100, 110, and 120%) 8, riding comfort setting switches (BAD, USUAL and GOOD) 9, a running condition setting button 10, and a setup acknowledgement lamp 11.

Figure 5:
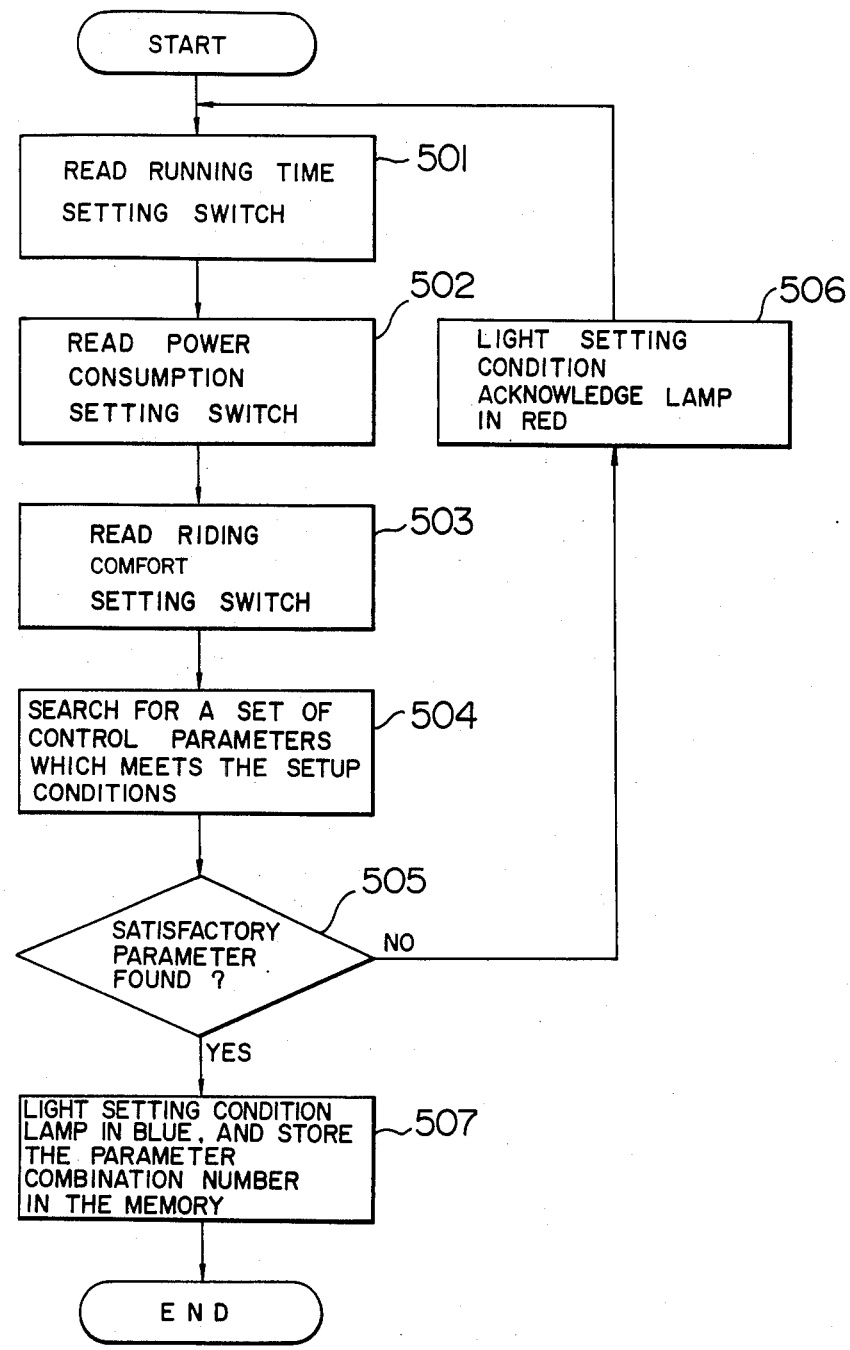
FIG. 5 is a flowchart showing the process of selecting control parameters by the microcomputer system embodying the present invention.
Figure 6:
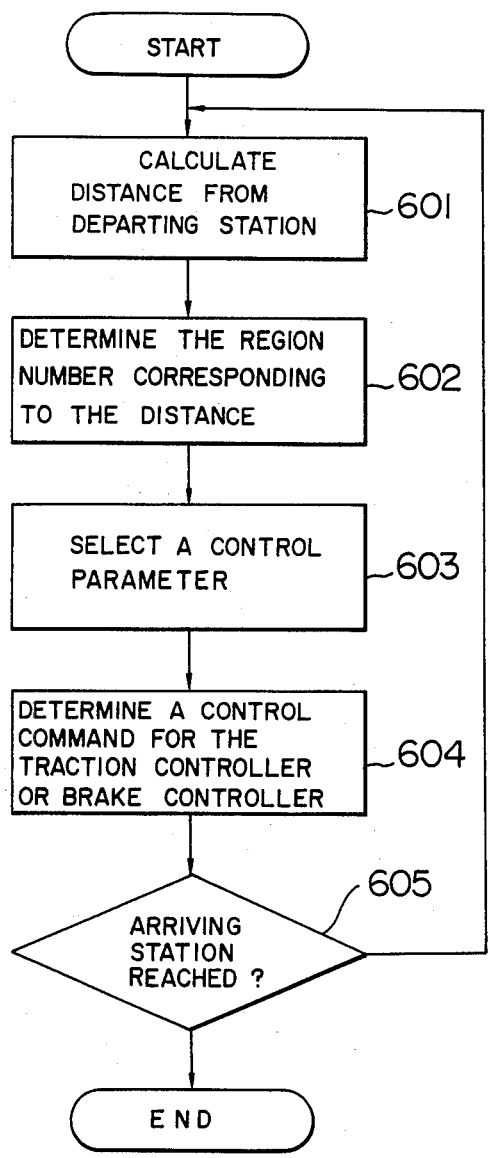
FIG. 6 is a flowchart showing the process of train control by the microcomputer system embodying the present invention.

FIG. 5 is a flowchart showing the control parameter selection process using a microcomputer according to the first embodiment, and FIG. 6 is a flowchart of processing for operating the train using the selected control parameter. FIG. 5 shows the process of selecting a combination of control parameters used for the running between two stations depending on the setup condition. This program is initiated when the running condition setting button 10 is pressed. The program reads the running time setting switches 7 (step 501), the power consumption setting switches 8 (step 502), and the riding comfort setting switches 9 (step 503) sequentially, and then searches the tables of n in number (FIG. 3) in the memory 5 for a combination of control parameters which meet the values of performance indices which have been read (step 504). If no satisfactory control parameter is found, the program lights the setup acknowledge lamp 11 in red (steps 505 and 506), or when satisfactory control parameters are found, the program lights the setup acknowledge lamp 11 in blue and sets the combination number i of the control parameters in the memory 5 (steps 505 and 507).

FIG. 6 shows the process of operating the train in accordance with the combination of control parameters obtained in the process of FIG. 5. This program is initiated in response to the departure command. The program first calculates the distance L of the immediate position from the departing station by the distance summation unit 3 (step 601). Then, the program determines the region number j (e.g., 1, 2 or 3 in FIG. 2) from the distance L (step 602) and determines a control parameter to be selected in the table of FIG. 3 for the current region from the control parameter combination number i and the region number j (step 603). Next, the program issues a control command to the traction controller 12 or brake controller 13 based on the selected control parameter (step 604). When the train reaches the arriving station, the process is terminated, or otherwise, the program is restarted from the beginning (step 605).

Accordingly, the present invention uses the conventional hardware equipment except for the additional button, switches and lamp (7-11) shown in FIG. 4 for setting the running condition, and implements the new function using the program stored in the microcomputer 6 and the performance index table stored in the memory 5. Namely, when power saving is requested in summer due to a high demand of power, the running condition can be set with the weight being placed at power reduction, or when the better riding comfort is requested, the weight can be placed for it, and thus the running condition which meets each purpose can be achieved. In addition, the running time can be modified under the restriction of other performance indices.

The performance tables shown in FIG. 3 are the lists of performance indices as a result of running when each control parameter is used for each region, and the control parameter tables Nos. 1, 2 and 3 are the lists of control commands to be issued to the traction controller 12 and brake controller 13.

Although in the foregoing embodiment the distance between two stations is divided by measuring the distance, the invention is not limited to this, but for example a control parameter may be selected by detection of signals located at positions between two stations. Although in the foregoing embodiment reference values of performance indices are given through the switches, they may be given from the computer of the central operation office through the communication line in advance of departure. It is also possible to execute the process shown in FIG. 5 by the computer in the central office and transmit only the result to the train.

According to the first embodiment of the invention, as described above, a plurality of sets of control parameters are prepared, the distance between two stations is divided into a plurality of regions, performance indices as a result of running when each control parameter is used for each region are prepared as tables, and control parameters to be selected in regions are determined on the basis of the requested performance indices in advance of the departure of the train, whereby the train can be operated automatically with satisfactory multidimensional performance indices such as power saving and better riding comfort.

Next, the second embodiment of the invention will be described. This is a method of automatic train operation control between two stations using predetermined control parameters, wherein one or more ground markers are placed between two stations, and there are provided a table containing the train speed, residual running time and scheduled power consumption (per unit weight) estimated when the train has passed each ground marker in a minimum possible time and further a table containing the increased running time and decreased power consumption in case the lower target speed is lowered for a certain distance after the train has passed each ground marker, so that the lower target speed which meets the target running time to the next station, that has been set before departure, at the least power consumption is determined when the train passes each ground marker.

Figure 7:
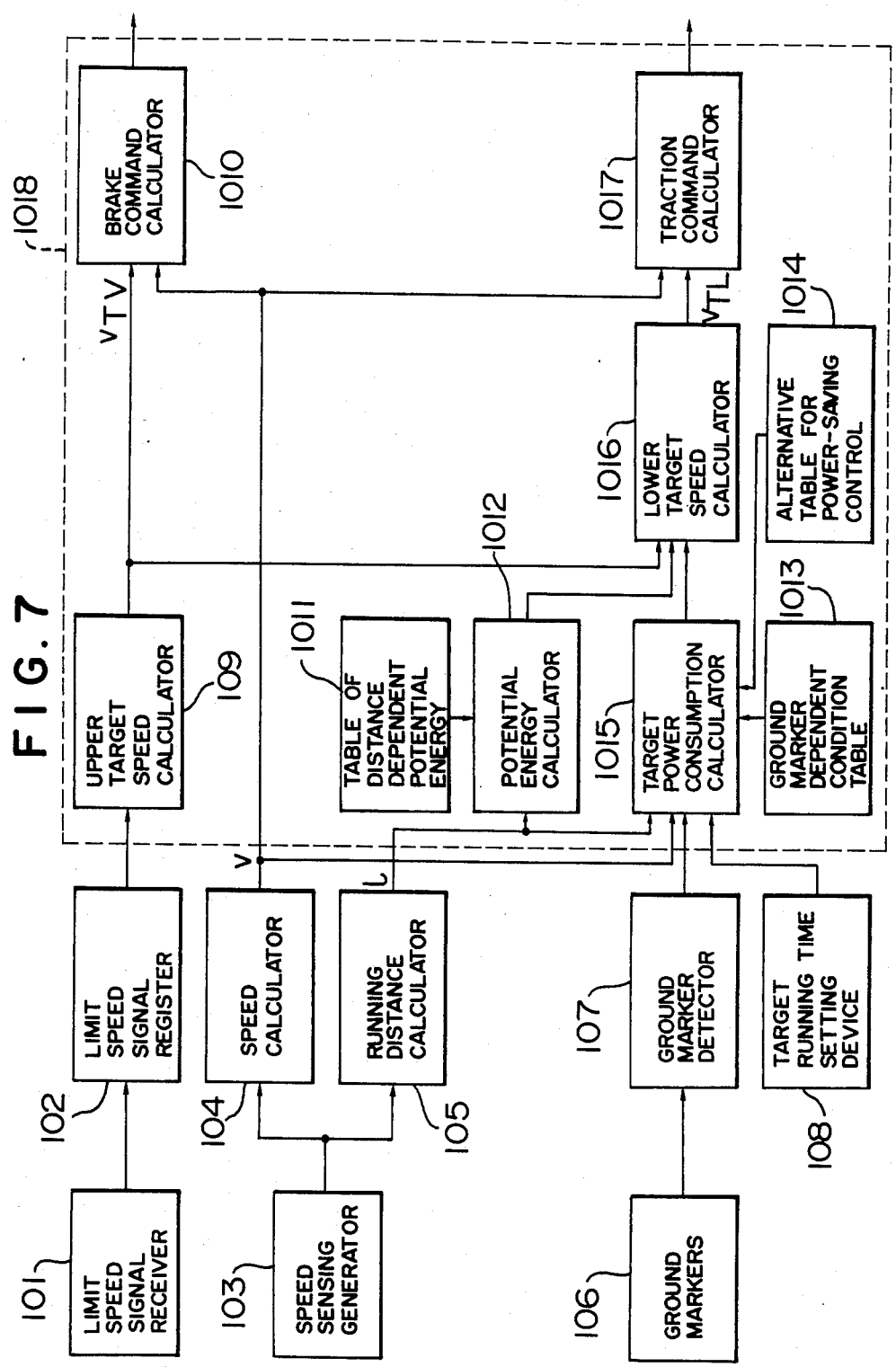
FIG. 7 is a block diagram of the automatic train operation controller according to the second embodiment of the present invention.

The embodiment will now be described in detail. FIG. 7 is a block diagram showing the second embodiment of the automatic train operation controller. In the figure, reference number 101 denotes a device for receiving the limit speed signal at the current position of the train, 102 is a register for holding the limit speed signal, and 103 is a speed sensing generator. Reference number 104 is a speed calculator which counts distance pulses produced by the speed sensing generator 103 to calculate the train speed v from the running distance in a past second. Reference number 105 is a running distance calculator which counts distance pulses since the train has departed so as to evaluate the running distance l from the departing station. Reference number 106 is a ground marker placed at a certain position between two stations, and a signal is generated in a ground marker detector 107 when the train passes the marker. The running distance measured at the detection of the ground marker 106 may be used to correct the error of the speed sensing generator.

Reference number 108 is a device for setting the target running time spent until the train will stop at the arriving station, and the device is set when the train starts from the departing station.

The target running time and target power consumption are set either through the switches equipped on the train or from the computer in the central operation command office through the communication line. The scheduled arriving time and power consumption are displayed in the train.

Reference num-ber 1018 denotes a microcomputer which realizes the control functions by executing the stored programs as will be described shortly. In FIG. 7, the program is divided into functional blocks. The microcomputer 1018 has a program 109 for calculating the upper target speed $v_{TV}$ to be followed by the train based on the contents of the limit speed signal register 102 and a program 1010 which calculates the brake command based on the upper target speed $v_{TV}$ and train speed v. Reference number 1011 is a table containing the values of potential energy possessed by the train located at positions at altitudes corresponding to the distance l from the departing station, and 1012 is a program for calculating the current potential energy (altitude) of the train from the distance l. Reference number 1013 is a condition table corresponding to the ground markers placed between two stations, 1014 is an alternative table for power-saving control containing the values of increased running time and saved power consumption achieved when the target power consumption is varied at each ground marker for a certain distance, 1015 is a program for calculating the target value of energy possessed by the train, 1016 is a program for calculating the lower target speed $v_{TL}$ by subtracting the current potential energy from the target energy, and 1017 is a program for calculating the traction command from the lower target speed $v_{TL}$ and train speed v.

The automatic train operation controller of FIG. 7 controls the train speed using the target arrival time and power consumption calculated when the train has passed a certain position, based on the rule that the train is operated always in the same running pattern by the automatic operation for the maximum running performance thereby to achieve the minimal running time and power consumption, and in the case of alteration of control at a certain position between two stations, the original minimal running pattern can be restored with a certain increase in running time and decrease in power consumption.

Figure 8:
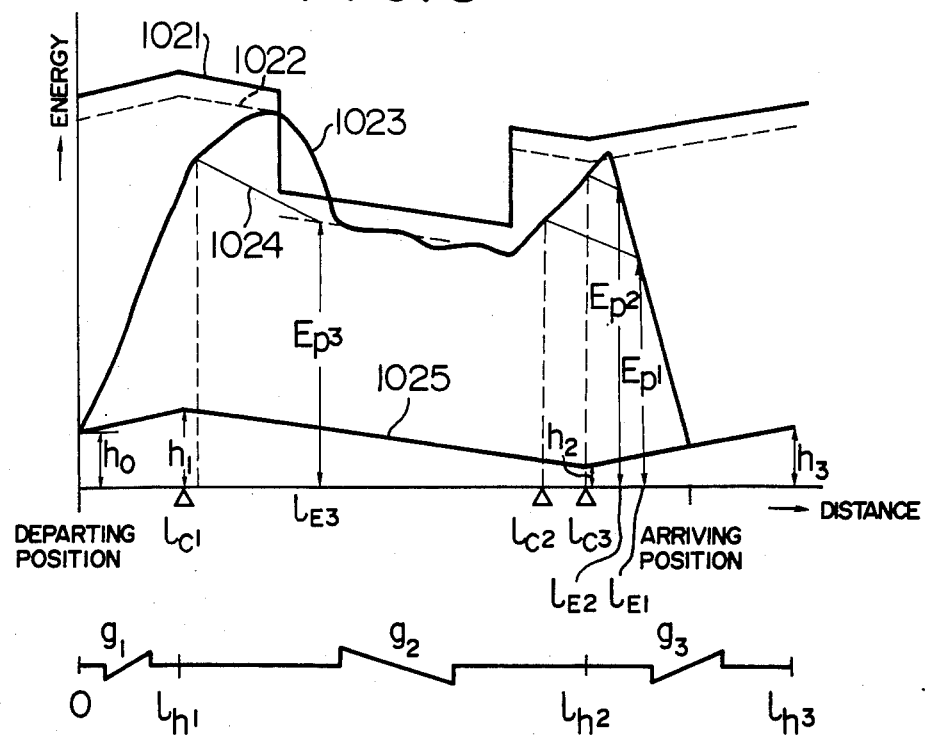
FIG. 8 is a graph used to explain kinetic energy possessed by a train running between two stations.

FIG. 8 is a graph used to explain energy possessed by the train running between two stations, plotting the sum of potential and kinetic energies of the train on the ordinate against the distance from the departing station on the abscissa. On the graph, curve 1021 shows the kinetic energy at the limit speed, curve 1022 shows the kinetic energy at the upper target speed, curve 1023 shows the standard running energy pattern, curve 1024 shows the power-saving running energy pattern, and curve 1025 shows the potential energy of the train.

When the train is operated to run in a minimal time by simply following the upper target speed $v_{TV}$, the standard running energy pattern 1023 shown in FIG. 8 will be followed. Here, the power-saving running energy pattern 1024 is shown, in which ground markers are placed at three positions $l_{C1}$, $l_{C2}$ and $l_{C3}$, and the train is operated to run following the lower target energy setup distance and its energy value at each position, $(l_{E1}, E_{P1})$, $(l_{E2}, E_{P2})$ and $(l_{E3}, E_{P3})$. This pattern is achieved by coasting. Declination of the curve is caused by the energy loss due to the running resistance such as the air resistance of the train.

Figure 9:
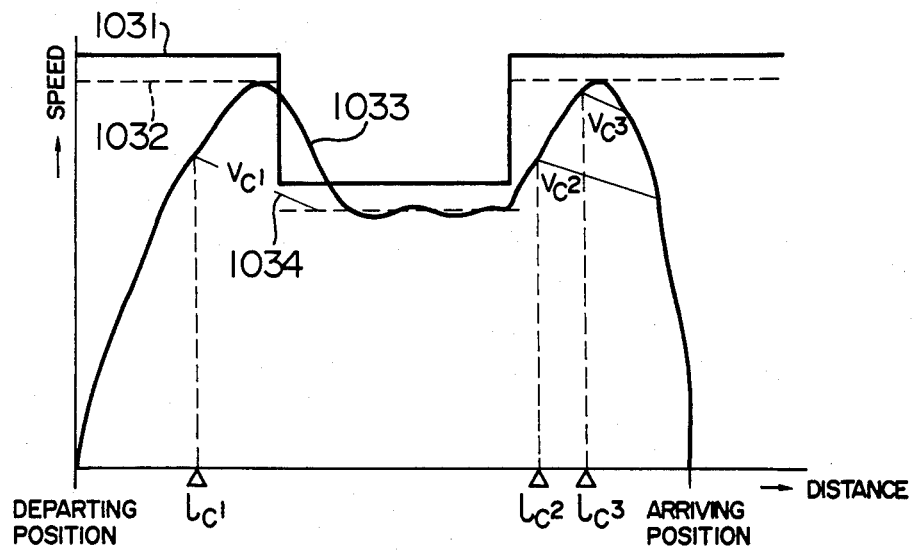
FIG. 9 is a graph used to explain the train speed in the same operating condition as of FIG. 8.

FIG. 9 is a graph showing the train speed on the ordinate plotted against the distance on the abscissa in the same operation as of FIG. 8. On the graph, 1031 indicates the limit speed, 1032 indicates the upper target speed, 1033 indicates the standard running speed pattern, and 1034 indicates the power-saving running pattern. The train speeds at ground marker positions $l_{C1}$, $l_{C2}$ and $l_{C3}$ are $v_{C1}$, $v_{C2}$ and $v_{C3}$, respectively. These values of speed in FIG. 9 are proportional to values of energy shown in FIG. 8 subtracted by the potential energy at the respective positions.

FIG. 10 shows the contents of the table 1013 provided in correspondence to the ground markers shown in FIG. 7. The column for ground marker 0 contains the initial value of standard residual running time $T_{co}$ which is the minimum running time required at starting, and the initial value of standard power consumption $E_{co}$ which is the power consumption per unit weight at starting. Other column for ground marker i ($i \leq 3$) contains the distance $l_{ci}$ from the departing station, the threshold speed $v_{ci}$ for the standard run, the standard (minimum) running time $T_{ci}$ for the remaining distance, and energy $E_{ci}$ used for the remaining distance.

FIG. 11 shows the contents of the alternative table 1014 for power-saving control shown in FIG. 7, and the table contains only the power-saving control factor J (J=3). This table indicates that the running time will increase by $\Delta T_j$ and power will be saved by the amount of $\Delta E_j$ if the train runs following the lower target power consumption $E_{pj}$ for a distance of $l_{Ej}$ after the train has passed the ground marker $N_{Ej}$, and also indicates that if this control is carried out, the control table of $N_{Tj}$ is included in the control and cannot be used. These values can be obtained by way of simulation or through the experiment using the actual train.

Figure 12:
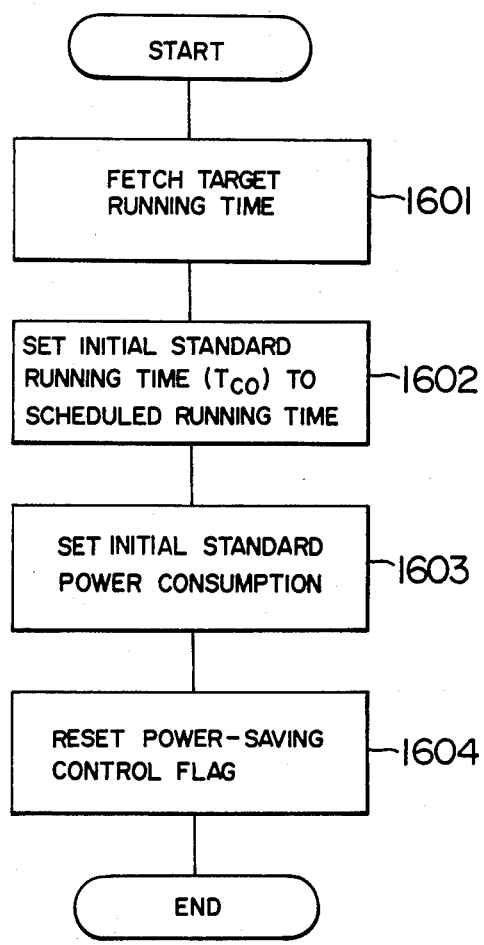
FIG. 12 is a flowchart showing the process carried out at train departure by the microcomputer according to the second embodiment of the present invention.
Figure 13A:
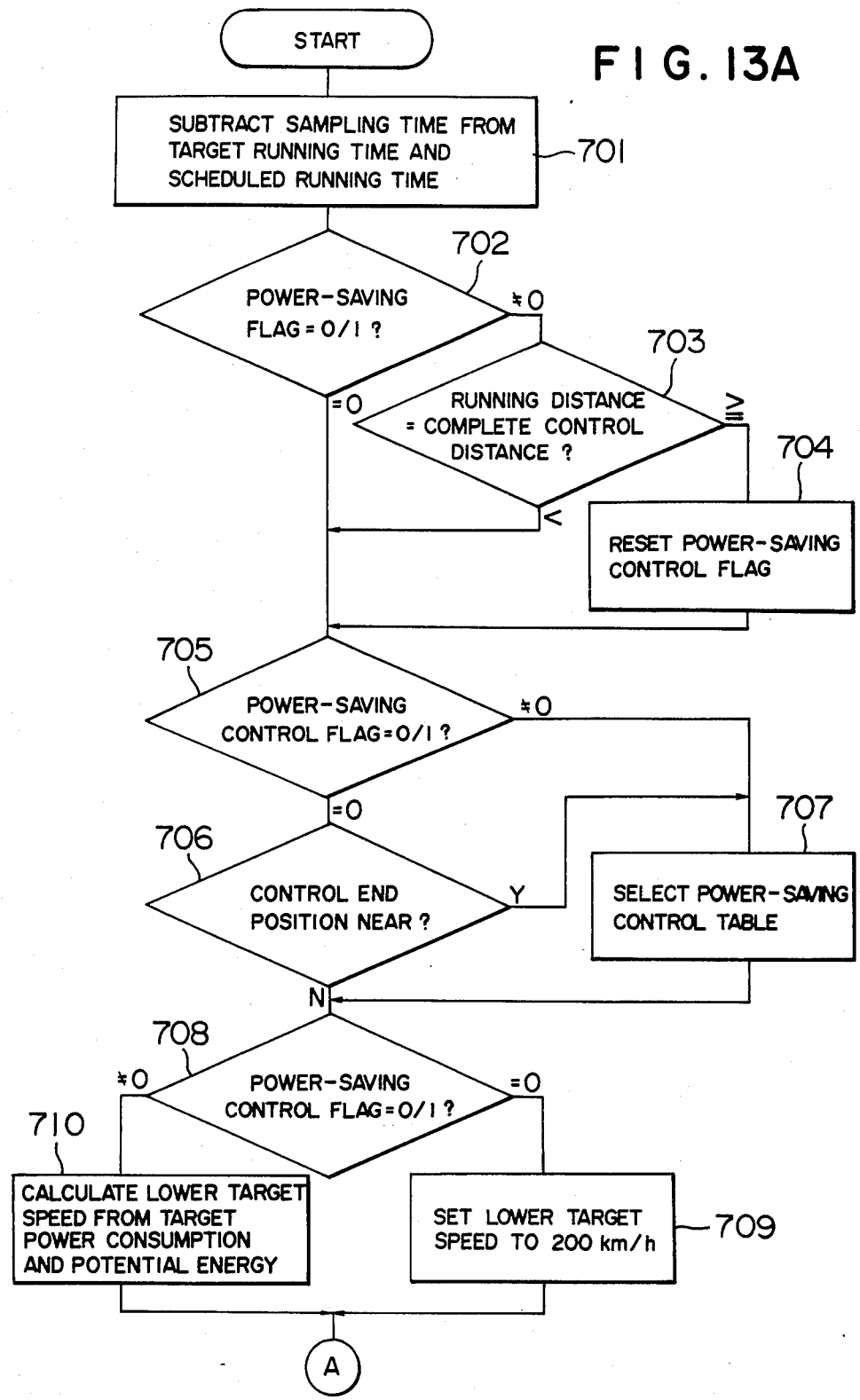
Figure 14:
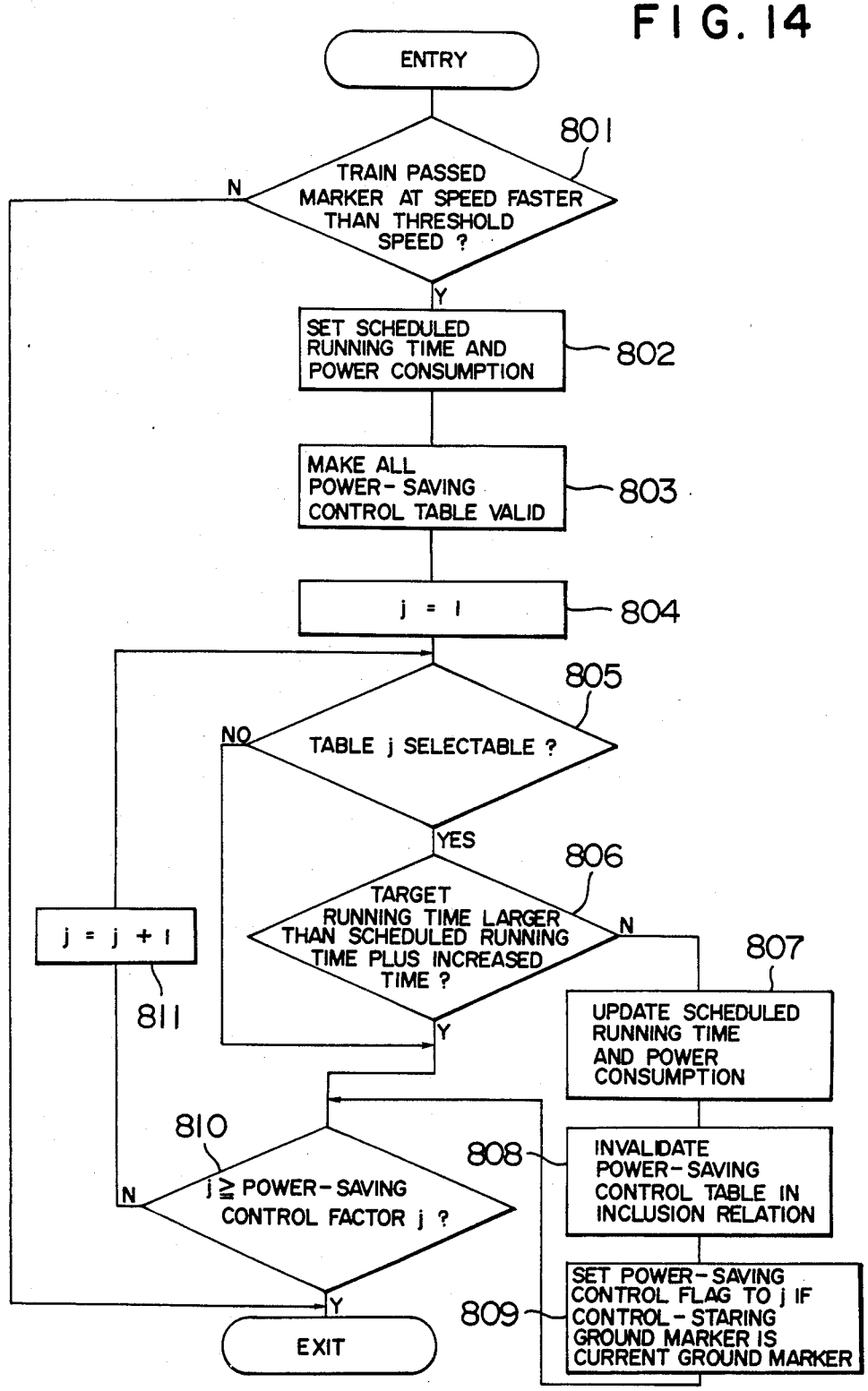
FIG. 14 is a flowchart of the process of selecting a column of alternative table for the power saving control.

FIGS. 12, 13 and 14 are flowcharts of the microcomputer embodying the present invention. The flowchart of FIG. 12 represents the operation of the processing program which is executed when the train starts. The program, initiated in response to the start command to the train, reads the running time between stations set on the target running time setting device 81 so as to set up the target running time (step 601), sets the scheduled running time to the field of initial standard running time ($T_{co}$) in the condition table 1013 (step 602), sets the power consumption to the field of initial standard power consumption ($E_{co}$) (step 603), and set the power-saving control flag to "0" (step 604).

The flowchart of FIGS. 13A and 13B shows the processing of the train control program which is executed at a sampling interval of Δt (e.g., 100 ms). The program, when initiated, first subtracts the sampling time Δt from the target running time and scheduled running time (step 701). Subsequently, the program checks whether the power-saving control flag indicating the selection of the alternative table 1014 has a value j other than "0" (step 702), and resets the control flag (step 704) if the running distance l is larger than the control completion distance $l_{Ej}$ (step 703). If the power-saving control flag is "0" (step 705) or the running distance l is in the vicinity of control completion distance $l_{Ej}$ of column j of power-saving control table under control e.g., 5 m to the end, (step 706), the program selects the power-saving control table (step 707). At this time, if the power-saving control flag is "0" (step 708), the lower target speed $v_{TL}$ is set larger (e.g., 200 km/h) (step 709), or if the control flag has a value j (step 708), the lower target speed $v_{TL}$ is obtained from the lower target power consumption $E_{pj}$ per unit weight (having the unit of m²/s²) and the potential energy $E_h$ at the current position l obtained from the running distance l with reference to the distance vs. potential energy table 1011 (step 710).

The potential energy $E_h$ and lower target speed $v_{TL}$ are calculated from the following equations.

$$E_h = G \cdot h \quad (1)$$

$$E_h = G \cdot h \quad (1)$$

$$V_{TL} = 3.6 \cdot \sqrt{E_{pj} - E_h} \quad (2)$$

where G is the gravitational acceleration (9.81 m/s²), h is the altitude (m) of the current position l, and constant 3.6 is a factor for converting the unit from m/s to km/h.

Subsequently, in FIG. 13B, the program calculates the upper target speed $v_{TV}$ from a speed corresponding to the contents of the limit speed signal register 2 (step 711). Next, the lower target speed $v_{TL}$ obtained previously is made lower than the upper target speed $v_{TV}$ (step 712). Then, the program calculates the brake command BN from the upper target speed $v_{TV}$ and the train speed v provided by the speed calculator 4, using, for example, the following equation (step 713).

$$BN = (v - v_{TV}) \cdot B_g \quad (3)$$

where $B_g$ is the gain of the brake command applied to the deviation of speed.

Subsequently, if the brake command BN is produced (step 714), the traction command PN is made "0" (step 715), or if the former is absent, the traction command is calculated using, for example, the following equation (step 716).

$$PN = (v_{TL} - v) \cdot P_g \quad (4)$$

where $P_g$ is the gain of traction command applied to the deviation of speed. The calculated brake command BN or traction command PN is fed to the drive/brake unit (step 717), and one cycle of processing is completed.

FIG. 14 shows the flowchart of the process for selecting the alternative table of power-saving control, and this is an expansion of the step 707 shown in FIG. 13A.

When the program enters this routine, it first checks the ground marker detector 107 to see whether the train has passed a ground marker during a period between the previous and present execution of the routine. If it is found that the train has passed a ground marker i, the program checks whether or not the train speed v is faster than the threshold speed $v_{ci}$ which is the speed to achieve the minimum running time plus a marginal speed (e.g., 2 km/h) (step 801), and if this is true, the program proceeds to step 802. In case the train has passed the ground marker i at a speed faster than the threshold speed $v_{ci}$, the standard residual running time $T_{ci}$ and standard power consumption $E_{ci}$ are set to the scheduled running time and power consumption (step 802).

Next, the whole alternative table for power-saving control 1014 is made effective (step 803). Subsequently, steps 805, 810 and 811 are carried out by incrementing the value of j by the amount of power-saving control factor J. Namely, checking is made first whether the ground marker $N_{Ej}$ for the beginning of control in the jth column of table is equal to or larger than the current ground marker i, and also whether it is invalidated by the selection of other control column (step 805). If the jth column can be selected, the target running time is compared with the scheduled running time added by the increased running time $\Delta T_j$, and if the train can run in time longer than the target running time even under this control (step 806), this column j control table is selected and the scheduled running time is increased by the increased running time $\Delta T_j$ and scheduled power consumption is decreased by $\Delta E_j$ (step 807). Next, the control table $N_{Tj}$ which has no effect during this control is invalidated (step 808). If the ground marker number for the beginning of control in the table is equal to the ground marker number i which is currently passed by the train, the power-saving control flag is made to have value j (step 809). If the power-saving control factor J is smaller than j, the program returns to step 805, while incrementing j by one, and checks whether the table can be selected (steps 810 and 811).

According to the present invention, the train is operated while calculating the presumed arrival time at the next station and power consumption time to time, allowing the marginal time to be used for the power-saving operation, and moreover, the train operation under the specified power consumption is also made possible.

Although in the foregoing embodiment, the lower target power consumption $E_{pj}$ is set each position of ground marker, the calculation related to potential energy may be omitted if the railroad has small variation of slope.

The alternative table for power-saving 1014 of J in number has the priority in the ascending order of the number, allowing the marginal time to be spent later and the like. The control table may be selected not only based on the running time, but on the target power consumption, or alternatively, it may be selected solely based on the target power consumption.

Although in the foregoing embodiment, the location of the train is determined using ground markers, it may be determined solely based on the running distance l from the departing station. The output of the distance calculator may be corrected using the running distance l obtained from the count at the detection of the ground marker and the actual distance $l_{ci}$ in the table.

As described above, this embodiment has the information table on the increased running time and saved power consumption when train is operated to follow the lower target speed or lower target power consumption after the train has passed one or more positions between two stations, allowing the selection of optimal control at each position based on the target running time, target power consumption, and the like, whereby the train can be operated to meet conditions of arrival time at the next station and power consumption.

What is claimed:

1. A method for automatic operation of a vehicle in which a vehicle is automatically controlled in accordance with control commands for operating a traction controller and a brake controller of the vehicle in order to run with required speed patterns through a plurality of regions into which a distance between two stations is divided, comprising the steps of:
preparing a table representative of a relation between a plurality of region control patterns for vehicle control, each of which designates control commands which are applied to the respective regions, and a plurality of performance index patterns relating to a plurality of predetermined performance indices reflecting the result of running of the vehicle when the vehicle is controlled in accordance with said region control patterns;
designating a performance index pattern for running of the vehicle from one station to the next station before the vehicle departs from the one station;
determining a region control pattern corresponding to said designated performance index pattern on the basis of said table; and
applying the control commands in accordance with said determined region control pattern to the vehicle speed control to run the vehicle.

2. A method of automatic vehicle operation according to claim 1, wherein said performance indices include running time between two stations, power consumption, and riding comfort.

3. A method for automatic vehicle operation according to claim 2, further comprising a step of displaying and designating another performance index pattern when said region control pattern corresponding to said designated performance index pattern is absent in said table.

4. A method of automatic vehicle operation according to claim 2, wherein said performance indices are set by operating switches provided on said vehicle or transmitted from a computer in a central operation command office through a communication line.

5. A method of automatic vehicle operation according to claim 1, wherein said performance indices are set by operating switches provided on said vehicle or transmitted from a computer in a central operation command office through a communication line.

6. A method for automatic vehicle operation according to claim 5, further comprising a step of displaying and designating another performance index pattern when said region control pattern corresponding to said designated performance index pattern is absent in said table.

7. A method for automatic vehicle operation according to claim 1, further comprising a step of displaying and designating another performance index pattern when said region control pattern corresponding to said designated performance index pattern is absent in said table.

8. A method of automatic train operation of a train between stations using predetermined control parameters with one or more ground markers placed between stations, comprising a first step of recording as control parameters the train speed, a target train speed, residual running time and scheduled power consumption after the train has passed each of said ground markers on schedule running time; a second step of recording as control parameters the increased value of running time and decreased value of power consumption in case the lower target train speed is lowered when the train passes each of said ground markers; a step of determining, when the train passes each of said ground markers, as a control parameter a lower target train speed which demands the least power consumption and satisfies a target running time to be spent until the train reaches an arriving station, said target running time being preset before the train has started from a departing station; and a step of running the train in accordance with the control parameters including at a lower target train speed for a determined distance.

9. A method of automatic train operation according to claim 8, wherein said lower target train speed is determined by first setting a lower target power consumption with reference to a table of potential energy possessed by the train in correspondence to a running distance from the departing station, and next by subtracting a current potential energy of the train from said lower target power consumption.

10. A method of automatic train operation according to claim 8, wherein said increased running time and decreased power consumption are recorded in a plurality of columns of a table with priority levels appended thereto, so that a column of the table is selected on a priority basis.

11. A method of automatic train operation according to claim 9, wherein said increased running time and decreased power consumption are recorded in a plurality of columns of a table with priority levels appended thereto, so that a column of the table is selected on a priority basis.

12. A method of automatic train operation according to claim 9, wherein said ground markers placed between stations is substituted by positional information which is derived from a running distance measured since the train has started from the departing station.

13. A method of automatic train operation according to claim 9, wherein said lower target speed or lower target power consumption is determined based on a target power consumption or the combination of a target power consumption and target running time instead of being determined solely from the target running time.

14. A method of automatic train operation according to claim 8, wherein said ground markers placed between stations is substituted by positional information which is derived from a running distance measured since the train has started from the departing station.

15. A method of automatic train operation according to claim 8, wherein said lower target speed or lower target power consumption is determined based on a target power consumption or the combination of a target power consumption and target running time instead of being determined solely from the target running time.

16. A method for automatic vehicle operation in which a vehicle is automatically controlled in accordance with control commands for operating a traction controller and a brake controller of the vehicle in order to run with required speed patterns through a plurality of regions into which a distance between two stations is divided, comprising the steps of:
preparing a first table containing standard train speeds relating to the respective regions, standard residual running time from one station to the next station, and scheduled power consumption estimated when the vehicle is run with a standard speed pattern, and preparing a second table containing increased running time and decreased power consumption in case the vehicle is run for a predetermined distance for a reduced lower target speed for each of the regions;

designating a target running power which is required for the vehicle running from the one station to the next station before the vehicle departs from the one station;

running the vehicle by said control commands in accordance with said standard speed patterns;

substracting a time of elapse after vehicle departure from said target running time to calculate a target residual running time permitting the vehicle to arrive at the next station;

calculating a reduced target speed lower limit value for saving of power consumption to correspond to a surplus time equal to the difference between the target residual running time and the standard residual running time by reference to said first and second tables when the vehicle passes by standard points relating to the respective regions; and running tbe vehicle at a speed of said reduced target speed lower limit value for a predetermined distance designated by said second table.

17. A method for automatic vehicle operation according to claim 16, wherein said second table includes a lower target energy corresponding to said reduced target speed, and further comprising the steps of preparing a third table representative of a relation between a running distance from the one station of departure and a potential energy of the vehicle, and calculating said reduced target speed lower limit value on the basis of said lower target energy in said second table and said potential energy in said third table corresponding to a present position of the vehicle.

18. A method of automatic vehicle operation according to claim 17, wherein said second table includes a relation among running distance under reduced speed from each of the standard points, increased running time and saved power consumption so that running distance under reduced speed from a standard point includes running distance under reduced speed from a next standard point to give a fixed priority order so as to save power consumption.

19. A method for automatic vehicle operation according to claim 17, wherein said standard points relating to the respective regions are determined on the basis of the one station of departure.

20. A method for automatic vehicle operation according to claim 17, wherein said standard points relating to the respective regions are detected by receiving signals from ground markers arranged between the two stations.

21. A method for automatic vehicle operation according to claim 16, wherein said second table includes a relation among running distance under reduced speed from each of the standard points, increased running time and saved power consumption so that running distance under reduced speed from a standard point includes running distance under reduced speed from a next standard point to give a fixed priority order so as to save power consumption.

22. A method for automatic vehicle operation according to claim 21, wherein said standard points relating to the respective regions are determined on the basis of the one station of departure.

23. A method for automatic vehicle operation according to claim 21, wherein said standard points relating to the respective regions are detected by receiving signals from ground markers arranged between the two stations.

24. A method for automatic vehicle operation according to claim 16, wherein said standard points relating to the respective regions are determined on the basis of the one station of departure.

25. A method for automatic vehicle operation according to claim 16, wherein said standard points relating to the respective regions are detected by receiving signals from ground markers arranged between the two stations.

* * * * *